United States Patent [19]

Jabsen

[11] 4,165,256
[45] Aug. 21, 1979

[54] FUEL ELEMENT GRID PLATE WITH CORRUGATION AND BOSSES

[75] Inventor: Felix S. Jabsen, Lynchburg, Va.
[73] Assignee: The Babcock & Wilcox Company, New York, N.Y.
[21] Appl. No.: 554,874
[22] Filed: Mar. 3, 1975
[51] Int. Cl.² .............................................. G21C 3/02
[52] U.S. Cl. .................................... 176/78; 176/76
[58] Field of Search ...................... 176/76, 78; 248/49, 248/68 R; 165/162

[56] References Cited

U.S. PATENT DOCUMENTS

| | | | |
|---|---|---|---|
| 3,607,640 | 9/1971 | Krawiec | 176/78 |
| 3,646,994 | 3/1972 | Piepers et al. | 165/162 X |
| 3,746,619 | 7/1973 | Iwao | 176/76 X |
| 3,814,666 | 6/1974 | Calvin | 176/78 |
| 3,920,515 | 11/1975 | Ferrari et al. | 176/78 |

FOREIGN PATENT DOCUMENTS

| | | | |
|---|---|---|---|
| 2156171 | 7/1972 | Fed. Rep. of Germany | 176/78 |
| 7014096 | 6/1971 | Netherlands | 176/78 |
| 1295860 | 11/1972 | United Kingdom | 176/78 |

Primary Examiner—Peter A. Nelson
Attorney, Agent, or Firm—Joseph M. Maguire; John P. Sinnott

[57] ABSTRACT

An illustrative embodiment of the invention has one or more corrugations formed in the surface of a fuel element grid for a nuclear reactor. Not only does the corrugation enhance the strength of the grid plate in which it is formed, but it also provides a simple and convenient means for regulating the reactor coolant pressure drop through an appropriate choice of the corrugation depth.

1 Claim, 3 Drawing Figures

FUEL ELEMENT GRID PLATE WITH CORRUGATION AND BOSSES

BACKGROUND OF THE INVENTION

1. Field of the Invention

This invention relates to nuclear reactor systems and, more particularly, to methods and apparatus for controlling fluid pressure drop within a nuclear reactor fuel element, and the like.

2. Summary of the Prior Art

To produce useful power from a nuclear reactor, it is necessary to accumulate a sufficient quantity of fissionable material, or nuclear fuel, in a relatively small volume that is known as the "reactor core". Usually, a reactor core comprises an array of thin-walled metal tubes that enclose pellets of uranium dioxide, or other suitable nuclear fuel material. These fuel-loaded tubes frequently are referred to as "fuel rods". For fuel handling and structural integrity purposes, groups of these fuel rods within the core are assembled together into fuel elements. The fuel element fittings engage the individual rods and keep the rods in proper relative position. These fittings maintain a spacing between the fuel rods that permit pressurized water, or some other suitable working fluid, to flow through the reactor core and absorb heat from the rods.

The absorbed heat, of course, is subsequently converted into useful work.

After a year or more of power generation, a sufficient quantity of the nuclear fuel within the rods is consumed to justify removing some of the "spent" fuel elements from the core and replacing them with fresh fuel elements.

Naturally, it is important that the fuel elements in this "core reload" should incorporate all of the most recent technical advances and improvements, while nevertheless matching the nuclear, thermal and hydraulic properties of the older fuel elements that are being replaced. This problem is further aggravated by the possibility that the "core reload" supplier is not necessarily the same source as the manufacturer who produced the fuel elements that are undergoing replacement. In this circumstance, the difficulties of matching the operational characteristics of fuel elements that are based on entirely different design principles become even more pressing.

There is, moreover, a need to insure the structural integrity of the fuel elements at all times. A number of approaches have been taken to provide a satisfactory answer to the problems posed by the need for adequate strength in the fuel elements. In many instances, the fuel rods in a given fuel element are lodged within transversely disposed fuel element grids. Frequently, these grids comprise an array of mutually perpendicular, interlocking flat plates which form individual cells. It is within these cells that the fuel rods are received. Bosses that protrude from the plates grip the adjacent surfaces of the fuel rods and support the rods against the hydraulic and thermally generated forces to which the fuel rods are subjected.

The strength required of a fuel element grid in these circumstances must be balanced against the need to keep at an absolute minimum all materials in the reactor core that do not contribute directly to the fission process. This latter requirement is based on the rather obvious consideration that the probability for generating undesirable debris in the reactor core is in some way related to the mass of material that is within the core.

A further and somewhat more subtle reason for reducing structural core material is the parasitic effect that these materials impose on the reactor's neutron population. In this respect, neutrons, emitted from a fissioning uranium nucleus are absorbed in other uranium nuclei to cause these nuclei, in turn, to fission and thereby release energy and further neutrons. It is these successive second generations of neutrons that continue to propagate the fission process. Clearly, neutron conservation is important to the economical operation of the reactor because wasted neutrons reflect wasted fissionable material, or fuel. Thus, neutrons absorbed in non-fissionable reactor core materials represent a loss and an operating inefficiency.

Consequently, the fuel element supplier, and especially a supplier who is providing a reactor core reload, is faced with the task of resolving a number of difficult and essentially conflicting requirements. In this circumstance, the hydrodynamic characteristics of the used fuel elements must match those of the replacement units. This match—and particularly if the pressure losses imposed on the reactor coolant through the older fuel elements are greater than the pressure losses, or "drop" inherent in the replacement grid design should be achieved without introducing parasitic neutron absorbing materials or possible sources of debris into the reactor core.

With respect to grid strength, it also should be noted that the practice of adding a panel or an additional thickness of metal to the central portions of the surface of the individual cells may actually fail in the design purpose between the weakest point in the cellular structure seems to be at the corners that are formed by the interlocking plates. These panels are subject to an additional disadvantage in that they appear to disturb local coolant flow conditions to a degree that will produce "hot spots", or small areas of exceptionally high temperature due to coolant blockage. The potential existance of these "hot spots", and their possible destructive effect, compels the reactor design to be operated at a power level significantly below that which could be enjoyed in the absence of these local temperature anomalies.

Accordingly, there is a need to provide a fuel element that not only is strong, but also can be adapted to produce a predetermined coolant pressure loss without adding parasitic structure to the reactor core.

SUMMARY OF THE INVENTION

These and other problems that have characterized the prior art are eliminated to a large extent through the practice of the invention. Thus, for example, one or more transverse corrugations are impressed in the surfaces of the fuel element grid plates. These corrugations enhance the physical strength of the grids, thereby producing a grid of equivalent strength with relatively thin gauge metal, or lend greater strength to grid plates of the same thickness. The corrugations, moreover, establish a baffle within the grid cells that produces a coolant pressure loss without risking the development of "hot spots". The specific pressure loss that the structure produces, moreover, can be selected through an appropriate choice in number and depth of corrugations in each cell.

The invention enables the hydrodynamic characteristics of a reactor core replacement fuel element to be matched to the corresponding characteristics of any one of a number of used fuel elements of entirely different design. Further, this hydrodynamic match is produced in a manner that does not introduce additional parasitic material into the reactor core and actually strengthens the fuel element grid structure for a given thickness of grid plate.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENTS

Figure 1:
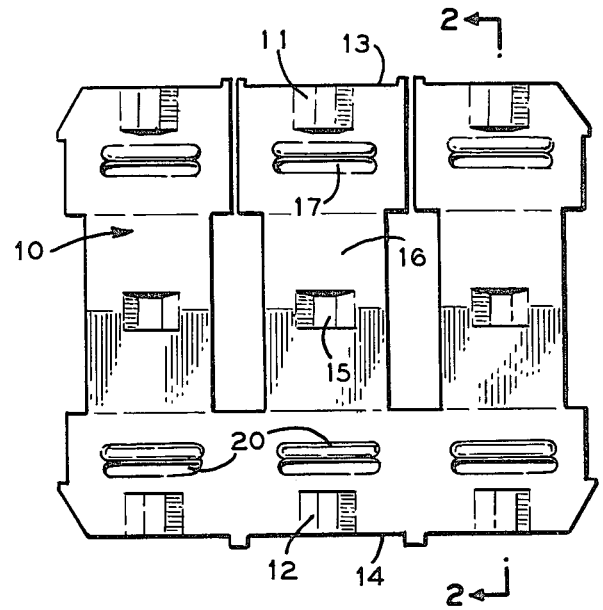
FIG. 1 is a front elevation of a portion of a fuel element grid plate that embodies principles of the invention.

For a more complete appreciation of the invention, attention is invited to FIG. 1 which shows a typical plate 10 for use in a nuclear reactor fuel element grid. The plate 10 is a generally flat sheet of Inconel, or some other suitable material that has bosses 11, 12 protruding from the surface of the plate 10 on opposite transverse plate edges 13, 14. The bosses 11, 12 jut out of the plane of the drawing and in a direction that is away from the viewer. Another boss 15 is formed in the transverse midplane of the plate 10 and protrudes from the plane of the drawing in a direction toward the viewer. As shown more clearly in FIG. 2, the boss 15 is flexed forward on the leading edge of a shallow Vee 16 that is pressed into the plate 10.

Figure 2:
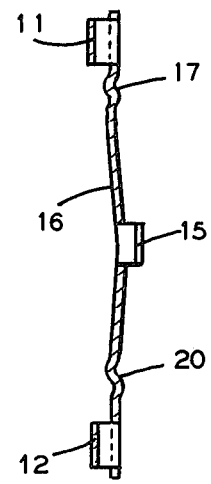
FIG. 2 is a side elevation of the fuel element grid plate taken along the line 2—2 of FIG. 1, looking in the direction of the arrows.

In accordance with a feature of the invention, and illustrated in FIGS. 1 and 2, corrugations 17, 20 are pressed, or otherwise formed in the surface of the plate 10. Typically, the corrugations 17, 20 are disposed in a direction that is generally parallel to the transverse midplane of the plate 10 and spaced just inward of the bosses 11, 12 respectively.

In a typical grid plate, the corrugations 17, 20 are about $\frac{3}{8}$" long and protrude in either direction about 0.020" beyond the opposite surfaces of the plate 10. The width, moreover, of each of the corrugations 17, 20 that are shown in FIGS. 1 and 2 is about 0.120". Naturally, if a greater coolant pressure drop is desired in the fuel element grid structure, the corrugations 17, 20 can be pressed more deeply into the plate 10 in order to protrude a greater distance from the grid plate surface and thereby to present a greater baffle area to the collant that flows through the grid structure. Conversely, if a lower coolant pressure drop is desired in the grid structure, the corrugations 17, 20 should not be impressed so deeply into the plate 10.

The depth of the corrugations 17, 20 to achieve a specific pressure drop for a particular nuclear reactor depend on a number of variables, of which the number of grids in the reactor core, coolant flow velocity and the like are typical. In this respect, to determine the corrugation depth that is appropriate to a particular reactor, a number of plates can be manufactured, each with a different corrugation depth. These samples then can be subjected to flow tests under reactor operating conditions in order to determine the pressure loss that is associated with each corrugation depth. From this data, the corrugation depth most suitable to provide the desired pressure loss can be selected.

Not only do the corrugations 17, 20 increase the flexibility available to nuclear reactor core design with respect to hydrodynamic features, but the corrugations also strengthen the grid structure in the manner that is characteristic of corrugated materials.

Figure 3:
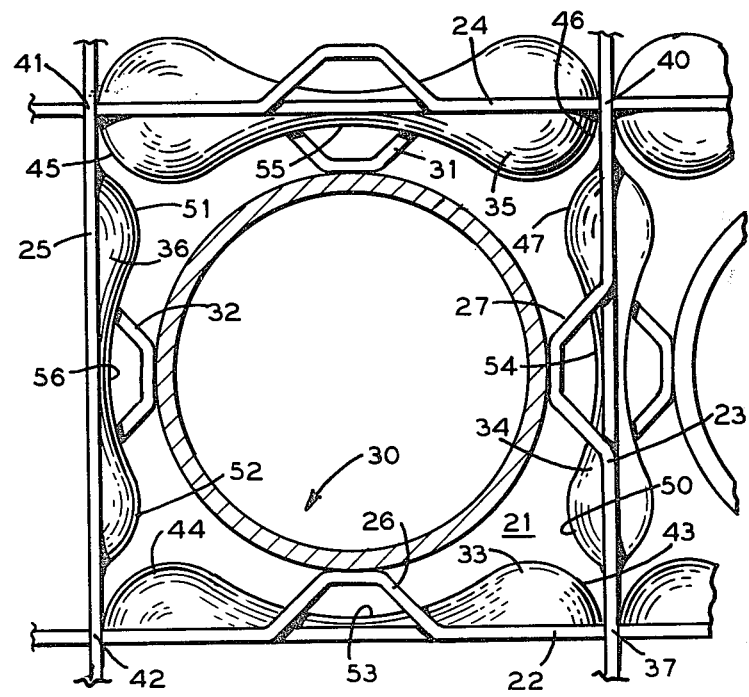
FIG. 3 is a plan view of a fuel element grid cell that shows another embodiment of the invention.

A further embodiment of the invention is shown in FIG. 3. As illustrated, a fuel element grid cell 21 is formed by means of portions of four interlocking grid plates 22, 23, 24, 25, in which parallel pairs of the plates 22, 24 and 23, 25 intersect to form the right angle corners of the cell 21. Bosses 26, 27, formed in the edges of the plates 22, 23, respectively, that are in the plane of FIG. 3 engage and grip the outer surface of a nuclear fuel rod 30. Below the plane of the drawing, and hence, protruding from the transverse midplane of the cell 21, bosses 31, 32 formed in the plates 24, 25 also grip the surface of the fuel rod 30.

In accordance with an additional feature of the invention, corrugations 33, 34, 35, 36 protrude from the surfaces of the plates 22, 23, 24, 25, respectively, toward the center of the cell 21. As shown in the drawing, the corrugations are impressed in the plate surfaces just below the level established by the bosses 26, 27. The corrugations, moreover, have shapes that further enhance the strength of corners 37, 40, 41, 42 of the cell 21. The corrugations 33, 35, for instance, that are formed in the grid plates 22, 24, extend across the entire transverse width of the cell 21 and have bulbous transverse extremities 43, 44 and 45, 46, respectively, that protrude into the cell and tend to reinforce the corners 37, 40, 41, 42. Transverse bulbous extremities 47, 50 and 51, 52 on the corrugations 34, 36, respectively, do not protrude as far away from the surfaces of the grid plates 23, 25 as the corresponding extremities on the plates 22, 24. The extremities 47, 50, 51, 52, however, have a shape that complements the adjacent bulbous extremities formed in the corner-supporting corrugations 33, 35.

It should be further noted that intermediate portions 53, 54, 55, 56 of all of the corrugations 33, 34, 35, 36 to not protrude into the grid cell 21 as far as the bulbous extremities described above. In this respect, attention is invited to the arcuate transition that these intermediate portions provide for the individual extremities.

There are, of course, a number of corrugation profiles which will avoid piercing, and thereby weakening, the grid plate structure that also will satisfy industrial needs in accordance with the principles of the invention. The specific position of the corrugation on a fuel element grid plate being subject to modification in accordance with grid strength and coolant pressure loss requirements.

The embodiments of the invention in which an exclusive property or privilege is claimed are defined as follows:

1. A fuel element grid plate for stabilizing elongated fuel rods having longitudinal axes comprising a generally flat sheet of metal, said sheet having a midplane transverse to the longitudinal axes and a pair of generally parallel edges also transverse to the longitudinal axes, at least one boss on the sheet protruding from the surface thereof in order to engage the surface of one of the fuel rods, and at least one corrugation disposed in a direction that is generally parallel to the transverse midplane, said corrugation formed in the surface of the sheet and spaced from the boss, said corrugation being generally parallel to and intermediate of the transverse edges and protruding from the surface of the sheet over a portion thereof a distance that is less than the boss protrusion in order to space the corrugation from the fuel rod surface, said corrugation having bulbous protrusions extending from the surface of the plate at the extremities of the corrugation, and an intermediate corrugation portion connecting the bulbous protrusions, said bulbous protrusion extending from the surface of said plate through distances that are greater than the intermediate corrugation portion.

* * * * *

UNITED STATES PATENT AND TRADEMARK OFFICE
CERTIFICATE OF CORRECTION

PATENT NO. : 4,165,256
DATED : August 21, 1979
INVENTOR(S) : Felix S. Jabsen

It is certified that error appears in the above—identified patent and that said Letters Patent are hereby corrected as shown below:

Column 2, line 34, delete "between"

and insert --because--.

Column 4, line 49, delete "to"

and insert --do--.

Signed and Sealed this

First Day of January 1980

[SEAL]

Attest:

SIDNEY A. DIAMOND

Attesting Officer

Commissioner of Patents and Trademarks